United States Patent [19]

Kervagoret

[11] Patent Number: 4,729,223
[45] Date of Patent: Mar. 8, 1988

[54] FULL POWER HYDRAULIC ASSISTANCE DEVICE

[75] Inventor: Gilbert Kervagoret, Argenteuil, France

[73] Assignee: Bendix France, Drancy, France

[21] Appl. No.: 875,039

[22] Filed: Jun. 17, 1986

[30] Foreign Application Priority Data

Jul. 3, 1985 [FR] France .................. 85 10167

[51] Int. Cl.⁴ .................. B60T 17/00; B60T 11/32
[52] U.S. Cl. .................. 60/566; 60/582
[58] Field of Search .................. 91/460, 6, 280; 60/555–559, 565–566, 560, 563, 582

[56] References Cited

U.S. PATENT DOCUMENTS

| 3,208,212 | 9/1965 | Schultz | 60/566 X |
| 4,312,182 | 1/1982 | Filderman | 91/460 X |

FOREIGN PATENT DOCUMENTS

| 2360140 | 6/1975 | Fed. Rep. of Germany . |
| 2942979 | 5/1981 | Fed. Rep. of Germany . |
| 1479746 | 3/1967 | France . |
| 2554875 | 5/1985 | France . |
| 2078325 | 1/1982 | United Kingdom . |

OTHER PUBLICATIONS

U.S. application Ser. No. 691,346, now allowed.

Primary Examiner—Robert E. Garrett
Assistant Examiner—George Kapsalas
Attorney, Agent, or Firm—Larry J. Palguta; Ken C. Decker

[57] ABSTRACT

Hydraulic assistance device comprising a housing (10) provided with a bore (12) in which a piston mechanism (30, 42) is slidably mounted, which mechanism is displaceable by a brake pedal between a first position linking a first chamber (38, 56), connected to a brake circuit (60), with a low-pressure reservoir and isolating this chamber (38, 56) from a high-pressure fluid source (66), and a second position isolating the chamber (38, 56) from the low-pressure reservoir and linking it with the high-pressure source (66), the piston mechanism (30, 42) being displaceable by the brake pedal in the event of failure of the high-pressure circuit (66) thereby producing pressure increase in a second chamber (69) connected to the brake circuit (60), characterized in that the working area of the piston mechanism (30, 42) is equal to the cross-section of the bore (12).

3 Claims, 1 Drawing Figure

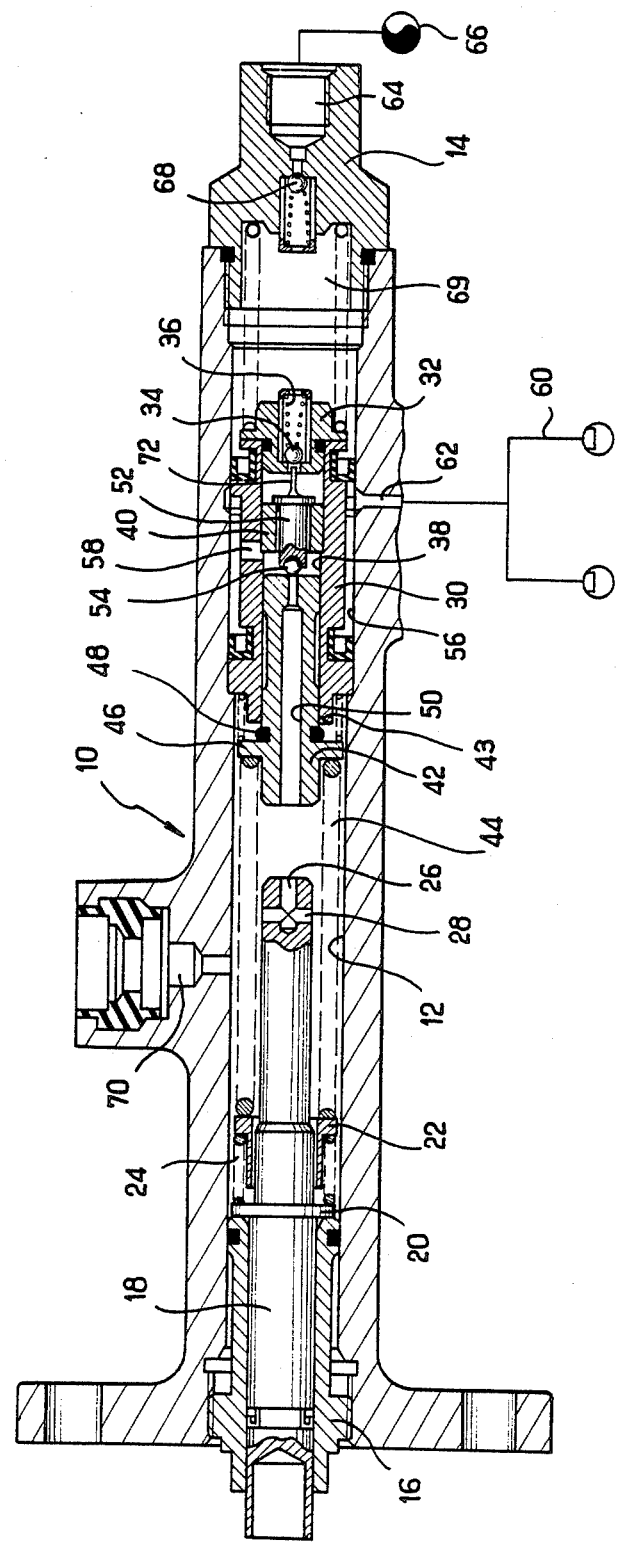

FULL POWER HYDRAULIC ASSISTANCE DEVICE

BACKGROUND OF THE INVENTION

1. Field of the Invention

The present invention relates to hydraulic assistance devices and more particularly to such devices intended for a brake circuit operating both hydrodynamically (more commonly known as full-power operation) and hydrostatically.

2. Brief Description of the Prior Art

The document FR-1-1,479,746 discloses a hydraulic brake booster of the full-power type which is provided for operating the control system of the clutch of a vehicle and which comprises a piston means having a valve for controlling high-pressure fluid capable of being actuated by the clutch pedal via a push-rod. When there is a failure in the high-pressure circuit, the piston means is able to move, thus allowing the push-rod to operate as the piston of a conventional master cylinder, and to thus create a standby hydrostatic pressure. However, since the diameter of the push-rod is small, the volume of fluid displaced by the push-rod is limited and therefore the device cannot be used for a vehicle brake system.

SUMMARY OF THE INVENTION

It is therefore, an object of the invention to provide an hydraulic assistance device of the full-power type capable of functioning as a conventional master cylinder in the event of failure of the high-pressure circuit and offering a large working volume of fluid suitable for successively operating a brake system.

According to the present invention there is provided an hydraulic assistance device comprising a housing provided with a bore in which a piston means is slideably mounted, which means is displaceable by a brake pedal between a first position linking a first chamber connected to a brake circuit, with a low-pressure reservoir and isolating this chamber from a high-pressure fluid source, and a second position isolating the chamber from the low-pressure reservoir and linking it with the high-pressure source, the piston means being displaceable by the brake pedal in the event of failure of the high-pressure circuit thereby producing a pressure increase in a second chamber connected to the brake circuit, characterized in that the working area of the piston means is equal to the cross-section of the bore.

BRIEF DESCRIPTION OF THE DRAWING

The invention will now be described by way of example with reference to the accompanying drawings in which the sole FIGURE is a longitudinal section of a hydraulic brake booster according to the invention.

DESCRIPTION OF THE PREFERRED EMBODIMENT

As shown in the FIGURE, the hydraulic assistance device for a brake system comprises a housing 10 with a main stepped bore 12 sealed at one end by a closure element 14. At the other end of the housing there is fixedly mounted a lining 16 in which there is sealingly and slideably mounted a push-rod 18 which is intended to be connected to a brake pedal (not shown) and which has an annular flange 20. A collar 22 is slideably mounted on the push-rod 18 and is connected to the flange 20 by a spring 24. At the opposite end to the brake pedal, the push-rod has a bore 26 connected to a transverse opening 28.

The device further comprises a bush 30 which is slideably and sealingly mounted in the bore 12 and which has a closure element 32 comprising a ball valve 34 urged towards its closed position by a spring 36. The bush 30 has a bore 38 in which there is fixedly mounted a sleeve 40 and, slideably mounted, an actuating piston 42. The actuating piston 42 is connected to the collar 22 by a spring 44 which bears against a flange 46 of the actuating piston 42. The actuating piston 42 has, in addition, a sealing ring 48 and a longitudinal stepped bore 50. An actuating member 52 is slideably mounted with play in the sleeve 40 and has a ball 54 adapted to close the stepped bore 50. The bore 38 is connected to an annular chamber 56 between the bush 30 and the housing 10 by an opening 58, and the annular chamber 56 is connected to a brake circuit 60 by a channel 62.

The closure element 14 has an inlet 64 intended to be connected to a high-pressure fluid source 66, as well as a ball valve 68. a chamber 69 is defined between the closure element 14 and the bush 30. The bore 12 is intended to be connected to a low-pressure reservoir (not shown) via a channel 70.

When the device is operated, the push-rod 18 moves to the right (when viewing the drawing) under the action of the brake pedal and, by means of the springs 24 and 44, causes the movement, to the right, of the actuating piston 42, which causes the stepped bore 50 to be sealed off by the ball 54. If the movement of the push-rod 18 continues, the actuating piston 42 and the actuating member 52 move together to the right and a pin 72 on the actuating member 52 opens the ball valve 34. Opening of the ball valve 34 allows the pressurized fluid to pass from the source 66 into the space, between the actuating member 52 and the sleeve 40, and then to the brakes 60 of the vehicle via the opening 58 and the channel 62. The fluid pressure inside the bore 38 gives rise to a return force on the actuating piston 42, thereby creating, by means of the springs 24 and 44, a pedal sensation force. The play between the actuating member 52 and the sleeve 40 serves to damp the release of pressure so as to avoid various undesirable hydraulic vibrations.

When the brake is released, the force exerted on the push-rod 18 is released and the latter allows the actuating piston 42 to return to the left, closing the ball valve 34 again and re-opening the bore 50. The pressurized fluid inside the bore 38 is thus free to pass through the bore 50 and the channel 70 to the low-pressure reservoir. If the force during release is stabilized, the ball 54 closes off the bore 50 again under the action of the various springs and creates a corresponding pressure in the brakes 60 of the vehicle.

In the event of failure of the high-pressure source 66, the ball valve 68 closes, isolating the chamber 69 from the high-pressure circuit. When the device is operated, displacement of the push-rod 18 causes the closure of the bore 50 by the ball 54, the opening of the ball valve 34 and the closure of the bore 38 by the sealing ring 48. The assembly consisting of the actuating piston 42 and the bush 30 moves to the right and compresses the fluid inside the chamber 69. The pressurized fluid passes through the ball valve 34 which is in its open position and, through the opening 58 and the channel 62, to the brakes 60 of the vehicle. Sealing is ensured by the sealing ring 48 which comes up against a conical surface 43 on the actuating piston 42.

As it is the assembly consisting of the actuating piston 42 and the bush 30 which moves, the effective working area is the entire cross-section of the stepped bore 12 at its point of maximum diameter. Therefore, the device may, in the event of failure of the high-pressure circuit, offer a large working volume of fluid suitable for successively operating the brakes of the vehicle.

It is envisaged that a ball-type joint for the spring be provided between the spring 44 and the actuating piston 42 in order to prevent the movement of the actuating piston 42 from being impeded by the action of the spring 44.

I claim:

1. An hydraulic assistance device comprising a housing provided with a stepped bore inside which piston means is mounted slideably, the piston means displaceable by means of a brake pedal between a first position communicating a first chamber, connected with a brake circuit, with a low-pressure reservoir and isolating the first chamber from a high-pressure fluid source, and a second position isolating the first chamber from the low-pressure reservoir and communicating the first chamber with the high-pressure fluid source, the piston means displaceable by the brake pedal in the event of failure of the high-pressure fluid source to produce a pressure increase in a second chamber connected with the brake circuit, characterized in that the piston means comprises a bush in which is mounted slideably an actuating piston, and high-pressure valve means, the actuating piston extending from the bush and into a reduced diameter section of the stepped bore, the actuating piston displaceable by means of the brake pedal so as to open the high-pressure valve means, the actuating piston and bush disposed within the second chamber which comprises an enlarged diameter section of the stepped bore so that in the event of the failure of the high-pressure fluid source a seal disposed about the actuating piston is displaced therewith to engage sealingly a substantially radial surface of the bush which is displaced by the actuating piston to displace a greater volume of fluid from the second chamber to the brake circuit than would be displaced through utilization of the reduced diameter section of the stepped bore, the booster further comprising a push rod connected with the brake pedal, a first spring disposed between the push rod and actuating piston and a second spring disposed between the actuating piston and bush, the seal disposed radially inwardly of the second spring.

2. The device in accordance with claim 1, characterized in that the actuating piston is displaceable by the brake pedal by means of a spring, and further comprising a ball-type joint between the spring and the actuating piston.

3. The device in accordance with claim 1, characterized in that the seal engages a conical surface of the bush to effect sealing therewith.

* * * * *